INVENTORS
Colin D. Gardner, Morris S. Chester,
and Franklyn A. Reynolds

United States Patent Office 3,327,199
Patented June 20, 1967

3,327,199
TRANSISTORIZED HIGH VOLTAGE REGULATED POWER SUPPLY SYSTEM WITH TEMPERATURE COMPENSATING MEANS
Colin D. Gardner, Glen Burnie, and Morris S. Chester and Franklyn A. Reynolds, Baltimore, Md., assignors to Westinghouse Electric Corporation, Pittsburgh, Pa., a corporation of Pennsylvania
Filed Aug. 23, 1963, Ser. No. 304,030
4 Claims. (Cl. 321—2)

The present invention relates to power supply systems for converting a lower DC voltage into a higher DC voltage and more particularly to a regulated high voltage power supply system which is regulated by the feature of providing a tertiary winding on the high voltage output transformer to generate a feedback voltage which is proportional to the high voltage output which in turn is used to control the regulator circuitry associated therewith.

It is an object of the present invention to provide voltage conversion apparatus having improved voltage regulation.

Another object of the present invention is to provide a transistorized high voltage power supply system of inexpensive construction which requires but few component parts of comparatively small size and weight.

And it is yet another object of the present invention to provide a regulated high voltage power supply which utilizes semiconductor devices such as transistors.

It is still another object of the present invention to provide regulation of the output voltage by compensating for changes of the input voltage by generating a feedback control signal in proportion to the output voltage.

Briefly, the subject invention comprises a DC to DC high voltage power supply system including a transistor chopper DC to AC inverter type circuit and a high voltage output transformer which includes an extra secondary winding, hereinafter referred to as a tertiary winding, which generates a feedback voltage which is proportional to the high voltage output. A passing element, for example, a transistor, is located between the DC input voltage and the DC to AC inverter circuit and is controlled by the voltage generated by the tertiary winding to provide a highly regulated DC input voltage to said inverter circuit. The DC to AC inverter circuit in turn produces a square wave of voltage which induces a high voltage output across the output secondary of the output transformer. This output voltage is then rectified to provide a high voltage DC across a pair of output terminals.

Figure 1:
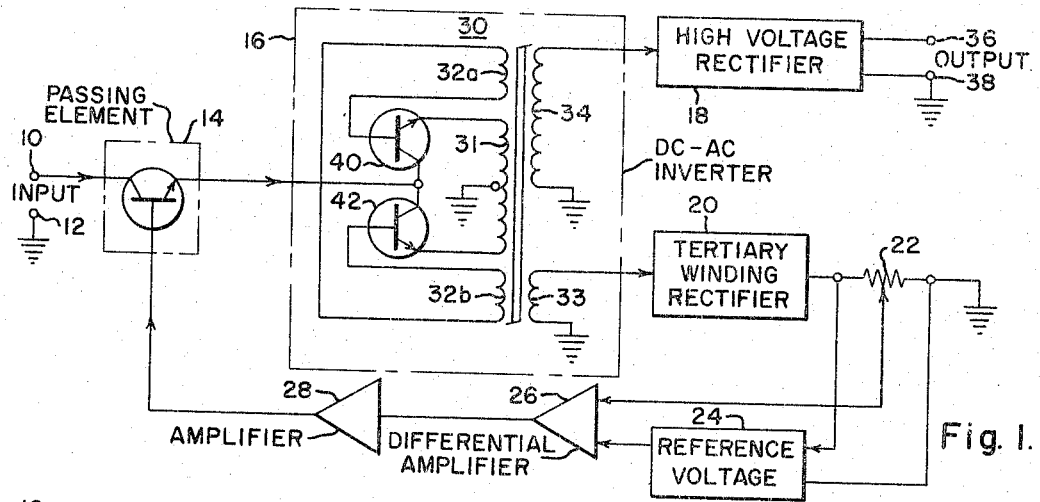
Figure 2:
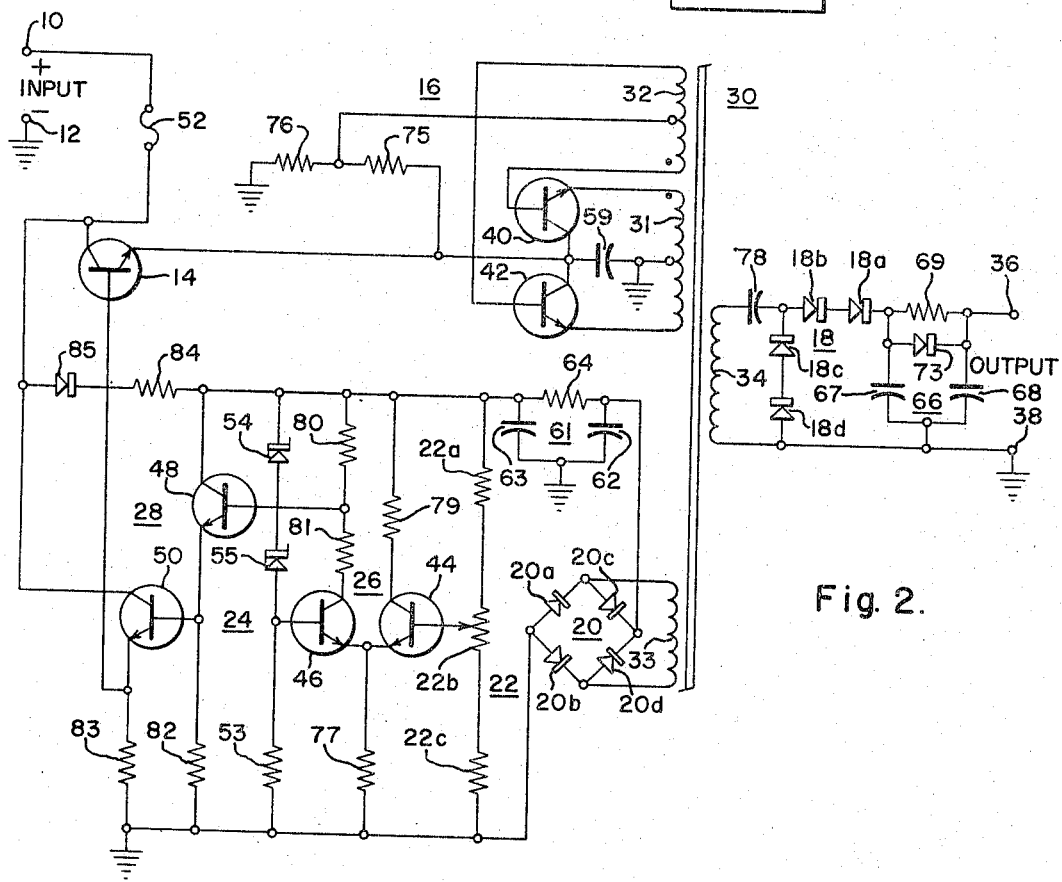

Other objects and advantages will become apparent as the following description proceeds when read in conjunction with the accompanying drawings, in which:

FIGURE 1 is a block diagram of a preferred embodiment of the subject invention; and FIGURE 2 is a circuit diagram schematically illustrating the preferred embodiment of the subject invention.

Referring to FIGURE 1, the preferred embodiment of the present invention comprises a chopper type DC to AC inverter circuit 16 which includes a pair of transistors 40 and 42 coupled to an output transformer 30 via a primary winding 31; a high voltage rectifier circuit 18 coupled to secondary winding 34; and a regulator circuit comprising a passing element 14, an amplifier 28 and a differential amplifier 26 operably coupled to a reference voltage means 24 and a feedback voltage generated by a tertiary winding 33 of the output transformer 30. The voltage generated by the tertiary winding 33 is rectified by a tertiary winding rectifier circuit 20 providing a DC feedback voltage which is directed to the differential amplifier 26 by means of a level set resistance 22. It should also be pointed out that the reference voltage applied to one input of the differential amplifier 26 is connected between the output of the tertiary winding rectifier 20 and ground potential. The passing element 14 is connected between terminal 10 of the input terminals 10 and 12 and the common connection of the collector electrodes of transistors 40 and 42. The output of the differential amplifier 26 is amplified and fed to the passing element 24 which acts as a variable resistance between the low voltage DC input voltage applied to the input terminals 10 and 12 and the DC to AC inverter circuit 46 in a manner that the passing element varies its resistance in accordance with a control signal from the amplifier 28 to provide a regulated DC input voltage to the inverter circuit 46. The DC to AC inverter circuit acts as a chopper to provide a periodically recurring waveform, e.g., a bipolar square wave, across the high voltage secondary output winding 34 of transformer 30. The high voltage rectifier circuit 18 transforms the flat topped square waves into a regulated high voltage output voltage at the ouput terminals 36 and 38. The tertiary winding 33 develops a voltage which is proportional to the high voltage output developed across secondary winding 34 such that when rectified by means of the tertiary winding rectifier 20 a feedback voltage for controlling the passing element 14 is available. This same isolated, regulated and well-filtered voltage is used to furnish power to operate the differential amplifier 26 and amplifier 28.

In greater detail, FIGURE 2 illustrates a schematic diagram of the preferred embodiment of FIGURE 1. Input terminal 10 is shown connected to one side of a fuse 52 to the collector electrode of transistor 14, the passing element for the voltage regulator circuit referred to above. Input terminal 12 is returned to ground potential. A low voltage DC input voltage is applied across input terminals 10 and 12 from a source (not shown). The emitter electrode of the transistor 14 is coupled to the DC to AC inverter circuit 16 at the common connection between the collector electrodes of transistors 40 and 42. The base electrodes of transistors 40 and 42 are respectively connected to the opposite terminals of a bias winding 32 of the output transformer 30. The center tap of the bias winding 32 is coupled to the common connection of resistors 75 and 76 forming a voltage divider across the regulated DC input voltage appearing between the collector electrodes of transistors 40 and 42 and ground. The emitter electrodes of transistors 40 and 42 are connected respectively to opposite end terminals of the primary winding 31 of the high voltage output transformer 30. The center tap of winding 31 is returned to ground. A capacitance 59 is connected between the collector electrodes of transistors 40 and 42 and ground to provide a local source of energy for the sudden high current demands of transistors 40 and 42 during switching and so smooth out any fluctuations in the regulated DC voltage applied to the collector electrodes of transistors 40 and 42. The core material of the transformer 30 is of a square hysteresis loop type material, for example, 2 mil thick ¼ inch wide strip wound Hipernik V formed into a coil having an inside diameter of 1.25 inches and an outside diameter of 1.75 inches.

The high voltage output winding 33 of transformer 30 is connected to four rectifier devices 18a, 18b, 18c and 18d through capacitor 78. The rectifiers are connected in a front-to-back series with the capacitor 78 connected to the common connection between rectifiers 18b and 18c. The high voltage DC output is taken across the series connection between the anode electrode of rectifier 18d and the cathode electrode of 18a. These rectifiers in combination with the capacitor 78 act as a voltage doubler circuit. The anode electrode of rectifier 18d is returned to ground potential whereas the cathode electrode of rectifier 18a is coupled to the output terminal 36 through a filter circuit comprising capacitors 67, 68 and the resistor 69 shunted by a diode 73. The output terminal 38 is returned to ground potential as well as one terminal of capacitors 67 and 68.

The tertiary winding 33 of the high voltage output transformer 30 is coupled to four rectifier devices 20a, 20b, 20c and 20d which are connected in a bridge circuit combination forming a tertiary winding rectifier circuit 20 whose DC output voltage thereacross is directly proportional to but relatively lower in magnitude than the high voltage developed across the secondary winding 34. The DC voltage appearing across the tertiary winding rectifier circuit 20 is coupled to a filter circuit 61 comprising capacitors 62 and 63 in combination with a temperature compensating resistance 64.

A differential amplifier circuit 26 comprises transistors 44 and 46 including a common emitter resistor 77, a collector load resistor 79 for transistor 44 connected to the DC output from the tertiary winding 33 and a pair of resistors 80 and 81 connected in series acts as the collector load for transistor 46 with the differential output being taken from the common connection therebetween. The base electrode of transistor 46 is connected to a point of reference potential established by the series circuit combination of Zener diodes 54 and 55 connected to resistor 53 across the DC feedback voltage from the filter circuit 61. The input to the base electrode of transistor 44 is a portion of the DC feedback voltage as predeterminedly set by a level set resistance combination comprising resistors 22a, 22b and 22c connected in series across the output of the filter circuit 61. The differential output voltage from the differential amplifier 26 is coupled to transistor 48 and then returned to the base electrode of transistor 14 through transistor 50 which is connected to transistor 14 in a Darlington circuit combination. Transistor 14 acts as the passing element for the voltage regulator. The collector of transistor 48 is connected directly to the DC voltage from the filter circuit 61. The collector of transistor 50 however is connected to the positive side of the input voltage which is connected to input terminal 10. The emitter electrode of transistor 48 is connected to an emitter resistor 82.

In operation transistor 14 is the passing element or variable resistance which drops the input voltage applied across input terminals 10 and 12 to a predetermined regulated voltage which is then applied to transistors 40 and 42, the primary winding 31, and the divider network comprising resistors 75 and 76. The bias winding 32 applies a slightly positive voltage with respect to ground to the base electrodes by means of the voltage divider action of resistors 75 and 76 to cause either transistor 40 or transistor 42 to conduct enough to develop a voltage across one-half of the primary winding 31. By transformer action the bias winding 32 has voltage induced a proper polarity to further close the transistor that started to close and open the other transistor. The term "close" is referred to as that operating state of a transistor in which the transistor is conducting while the "open" state is meant that the transistor is in its non-conductive state. This switch action is regenerative due to positive feedback around the transformer-transistor loop and within a few microseconds one transistor of transistors 40 and 42 is closed while the other is open. The transistor 14 supplies a regulated DC input voltage of predetermined magnitude across transistors 40 and 42; however the closed transistor conducts current through its respective half of the primary winding 31 inducing voltages in the secondary winding 33 and the tertiary winding 34 until the square loop core material of transformer 30 becomes saturated. At this time the change in flux with respect to time of the core sharply and suddenly reduces causing the induced voltages to decrease. At this instant the primary current in winding 31 is much higher than when the core was not saturated, and the bias voltage has all but disappeared across winding 32. The transistor which was closed cannot continue to be held in conduction; it therefore becomes non-conductive to remove the input voltage from its respective half of the primary winding 31 allowing the core of the output transformer 30 to return to its retentivity point. During the return however a slight voltage of reverse polarity is now induced in all of the windings of transformer 30 due to the fact that the core hysteresis loop is never perfectly flat topped. And this very slight voltage change is enough to trigger the avalanche switching process so that the transistor which was previously open or non-conducting now closes or becomes conducting; and the one which was closed, opens applying voltage to the other half of the primary winding to induce voltages into all other windings of opposite polarity. This action is repetitive and a periodic waveform of voltage, for example, a bipolar square wave, appears across the high voltage secondary winding 34. The tertiary winding 33 has a voltage appearing across it which is proportional to the voltage appearing across the output winding 34. It is rectified and filtered by the rectifier circuit 20 and the filter network 61 respectively and is presented to the voltage divider comprising resistors 22a, 22b and 22c, and the voltage reference network comprising Zener diodes 54, 55 providing inputs to the differential amplifier circuit 26. The input to transistor 44 is taken from the variable resistance 22b while the input to transistor 46 is the voltage reference established by the Zener diodes 54 and 55. The output of the differential amplifier 26 taken from the collector circuit of transistor 46 is further amplified by transistors 48 and 50 which applies a regulator control voltage to the passing element, transistor 14.

Tracing the regulator action, assume for example that the input voltage applied across input terminals 10 and 12 increases causing the one-half primary voltage of winding 31 to increase which therefore increases the tertiary winding voltage appearing across winding 33. Resistance 22b slider voltage increases causing a larger drop across resistance 77 thereby reducing the base to emitter voltage of the voltage reference side of transistor 46. This causes a larger voltage drop across transistor 46 reducing the current through the collector load resistors 80 and 81. Also the reduced signal current to the base electrode of transistor 48 lowers the voltage across resistor 82 which in turn reduces the conduction of transistor 50. A smaller control signal is therefore fed to the base electrode of transistor 14 tending to make transistor 14 less conductive which then drops more voltage across it counteracting the increased input voltage across the input terminals 10 and 12. A load decrease acts in a similar way causing the tertiary winding 33 to increase which reduces the input voltage accordingly.

The high voltage winding 34 provides a relatively high voltage square wave output across it in accordance with the chopper action of the transistor DC to AC inverter 16. This output is doubled and rectified by the rectifier configuration 18 in combination with the capacitor 78. The high voltage DC from the rectifier circuit 18 is then filtered by means of the filter network 66 to provide a DC output across the output terminals 36 and 38. The diode 73 is used in this circuit as follows: Assuming, for example, that the output requirements are (1) a well-filtered very low current in one direction of 10 to 100 μa. and (2) another condition of up to 1000 μa. (1 ma.) when the filtering requirements are not as severe. For condition (1) the drop across resistor 69 would be $$10^4 \times 100 \times 10^{-6} = 1 \text{ v.}$$

just enough to break over the diode; however, for condition (2) the drop across resistor 69 would be $$10^4 \times 1000 \times 10^{-6} = 10 \text{ v.}$$

The diode would break over at about .6 to .8 v. so that the output regulation would not be 10 v. but less than 1 v. This permits high resistance and, therefore, good filtering when it is required and clipping at 21 v. providing good regulation when it is needed.

What has been shown, therefore, is a regulated high voltage DC power supply which utilizes a tertiary winding in a closed loop regulator with the loop including the high voltage output transformer and the inverter circuit with the passing element correcting for any changes in the input voltage to provide a highly regulated DC voltage to the inverter circuit. It has been experimentally verified for example that the embodiment as shown in FIG. 2 where the input voltage was 28 volts DC and the high voltage DC output was 4000 volts, a change of less than .022% in output voltage occurred for a line variation of ±5% and a change of less than .028% in output voltage occurred for a load variation from 0 to 100 microamperes.

While there has been described herein a preferred embodiment of the present invention, it is to be understood that the foregoing description was made by way of example only and that various modifications, omissions and refinements may be resorted to without departing from the spirit and scope of the invention.

We claim as our invention:

1. A transistorized high voltage regulated power supply system comprising, in combination: input means for the application of a DC input voltage; voltage regulator means including a first transistor coupled to said input means for providing a variable resistance element to compensate for changes in said input voltage and providing a substantially constant DC voltage, said regulator means also including a second and a third transistor coupled together in differential amplifier circuit relationship and amplifier means connected between said differential amplifier and said first transistor for directing a control signal to said first transistor; a DC to AC inverter circuit operably connected to said first transistor for converting said regulated DC voltage into an alternating voltage having a square waveform; transformer means coupled to and forming part of said converter means for providing a high voltage square wave output voltage, said transformer means including induction means for providing another voltage of smaller magnitude than said high voltage square wave output voltage; first rectifier means connected to said induction means for providing another DC voltage which both supplies power to said differential amplifier circuit and said amplifier means and provides a feedback voltage to generate a control voltage for said first transistor; second rectifier means connected to said transformer means for providing a rectified high voltage DC output signal of a predetermined magnitude; and temperature compensating means operably connected to said first rectifier means for compensating for voltage variations of said second rectifier means due to temperature changes.

2. The transistorized high voltage regulated power supply system as claimed in claim 1 wherein said transformer means includes a primary winding, a secondary winding and a tertiary winding which develops a said another voltage which is of smaller magnitude than said high voltage output appearing across said secondary winding.

3. A regulated high voltage power supply system utilizing transistors comprising in combination: input means for the application of a DC input voltage; a transistor DC to AC inverter circuit including transformer means for providing a high voltage output having a periodic waveform of flat topped pulses; first rectifier means coupled to said transformer means for providing a high voltage DC output voltage; inductive means magnetically coupled to said transformer means for providing a voltage of smaller magnitude than said high voltage output; second rectifier means connected to said inductive means for providing a second DC voltage; temperature compensating means operably connected to said first rectifier means for compensating for voltage variations of said second rectifier means due to temperature changes; voltage regulator means coupled between said second rectifier means and said input means for providing a substantially constant DC voltage to said DC to AC inverter circuit, said voltage regulator means comprising circuit means coupled to said second DC voltage for providing a voltage reference, a differential amplifier circuit powered by said second DC voltage and having inputs connected to said voltage reference and a predetermined portion of said second DC voltage providing a control signal in accordance with the difference thereof, a passing element comprising a transistor connected between said input means and said DC to AC inverter circuits, and amplifier means coupled between said differential amplifier and said passing element to direct said control signal thereto for compensating for changes in said DC input signal to provide said regulated DC voltage to said DC to AC inverter circuit.

4. A high voltage regulated power supply system comprising, in combination: a transistor chopper DC to AC inverter circuit; transformer means including a primary, a secondary and a tertiary winding, said primary winding being connected to said inverter circuit, said secondary winding providing a substantially high voltage output thereacross; first rectifier means connected across said secondary winding for providing a high voltage DC output signal; voltage regulator means coupled between said tertiary winding and said DC to AC inverter circuit; temperature compensating means associated with said voltage regulator means for compensating for voltage variations of said first rectifier means due to temperature changes; another rectifier means connected across said tertiary winding for providing a DC voltage of smaller magnitude than said high voltage DC output voltage across said rectifier means connected across said secondary winding; circuit means coupled to said another rectifier means for providing a voltage reference of a predetermined magnitude; a differential amplifier circuit comprising a first and a second transistor having inputs connected to said voltage reference and a predetermined portion of said DC voltage from said another rectifier means respectively and providing an output signal in accordance with the difference; a third transistor acting as a variable resistance coupled to said DC to AC inverter circuit, and a third and a fourth transistor connected in circuit relationship between said output of said differential amplifier and said third transistor for delivering a control signal to said third transistor which varies its impedance in accordance therewith; input means connected to said third transistor for providing a low voltage DC input signal, and output means connected across said rectifier means connected to said secondary winding for providing a regulated high voltage DC output.

References Cited

UNITED STATES PATENTS

| | | | |
|---|---|---|---|
| 2,903,638 | 9/1965 | Evans et al. | 321—2 |
| 3,197,691 | 7/1965 | Gilbert | 321—18 |
| 3,235,786 | 2/1966 | Gaskill | 323—22 |

FOREIGN PATENTS

| | | |
|---|---|---|
| 826,783 | 1/1960 | Great Britain. |
| 594,701 | 6/1959 | Italy. |

OTHER REFERENCES

Electronics World, January 1962, pp. 53 and 68.

JOHN F. COUCH, *Primary Examiner.*

W. H. BEHA, JR., *Assistant Examiner.*